United States Patent Office 2,939,743
Patented June 7, 1960

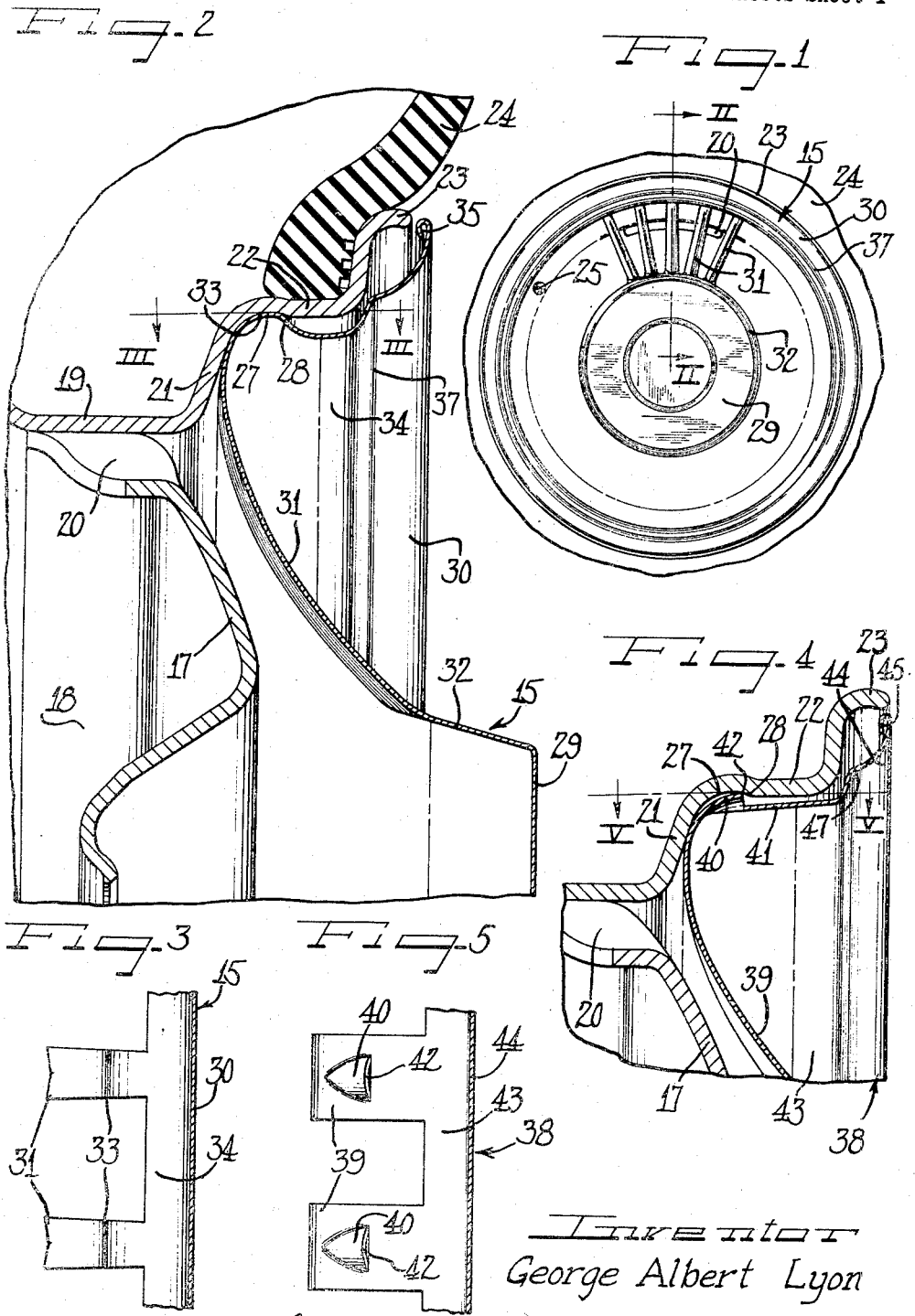

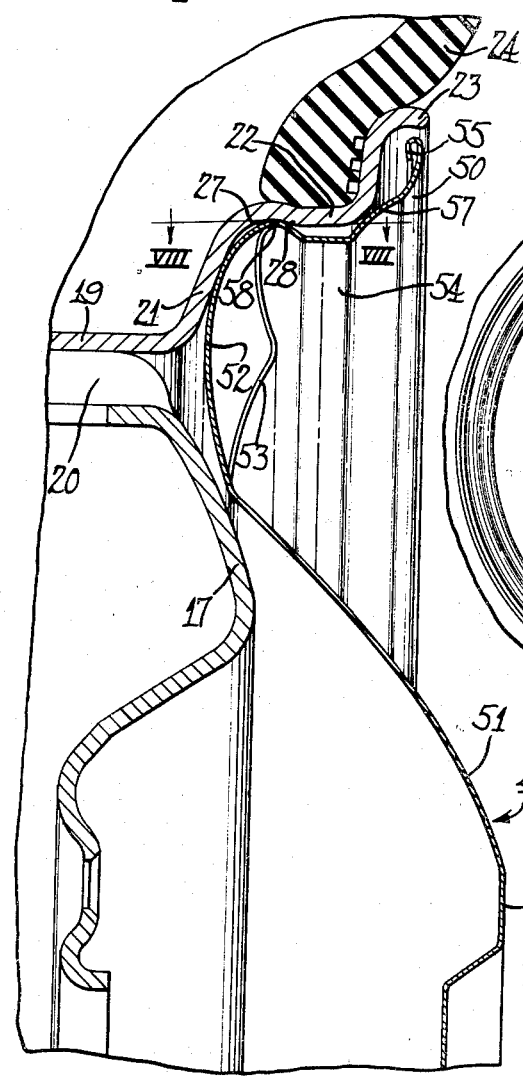
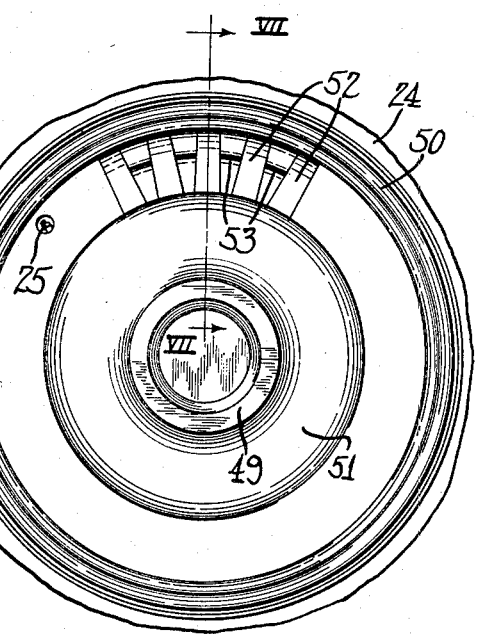
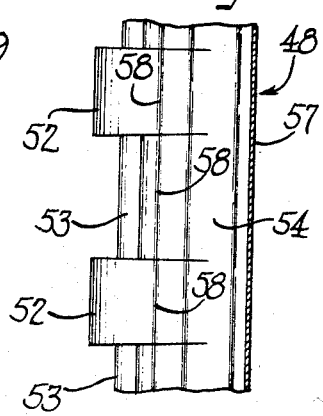

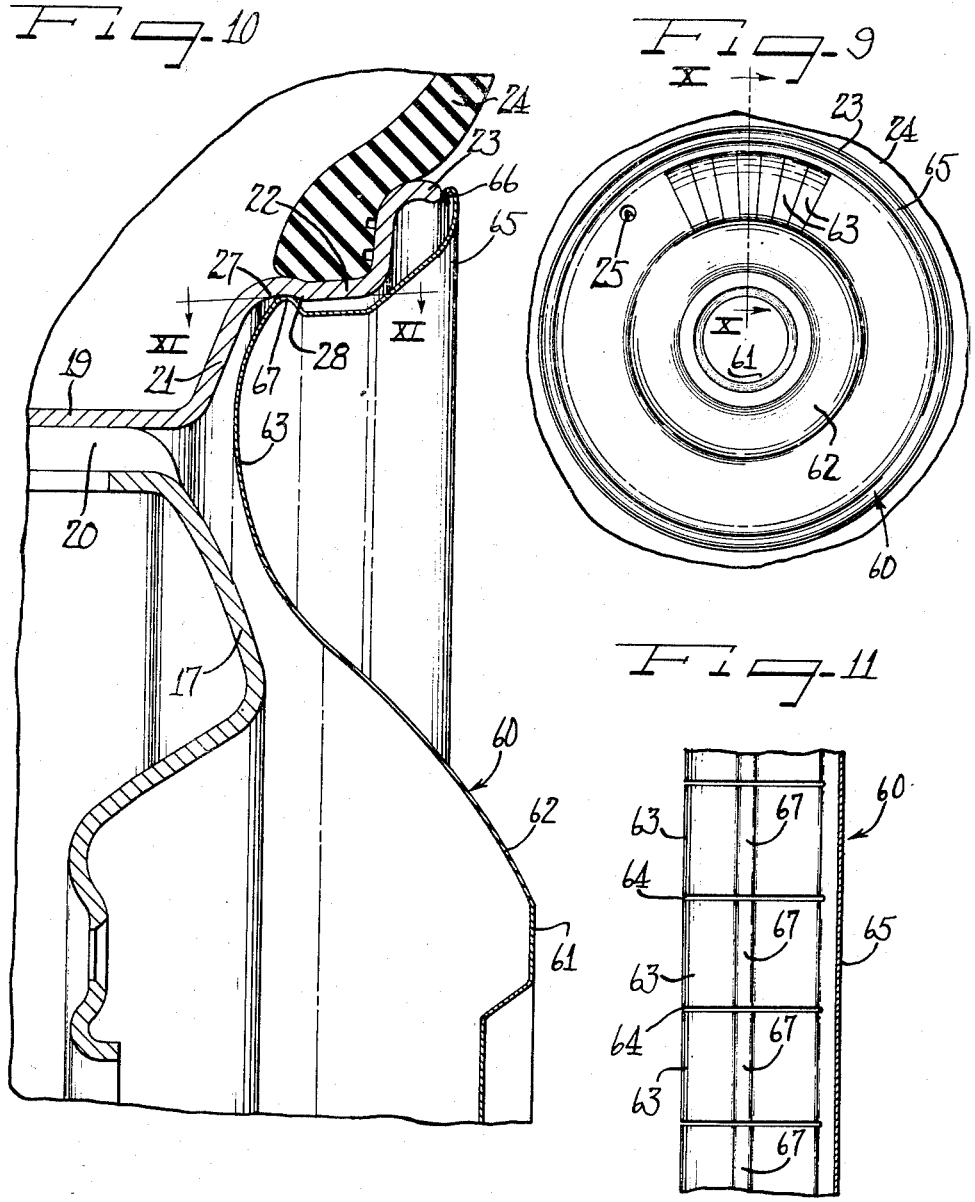

2,939,743

WHEEL COVER

George Albert Lyon, 13881 W. Chicago Blvd., Detroit, Mich.

Filed Feb. 10, 1955, Ser. No. 487,274

7 Claims. (Cl. 301—37)

The present invention relates to improvements in wheel structures and more particularly concerns the ornamental and protective covering of the outer sides of vehicle wheels.

An important object of the present invention is to provide improvements and refinements in the type of cover and wheel assembly disclosed in my copending application Serial No. 410,579 filed February 15, 1954, now Patent No. 2,754,943, dated July 17, 1956, and which is a continuation-in-part of application Serial No. 298,124, filed July 10, 1952, now abandoned, of which the present application is a continuation-in-part.

Another object of the invention is to provide an improved wheel structure of the safety rim type provided with a generally radially inwardly opening groove at juncture of the side and intermediate flanges of the tire rim and including improved cover means for snap-on, pry-off assembly with the wheel.

A further object of the invention is to provide improved means in a wheel cover for snap-on, pry-off cooperation with a grooved wheel member.

Other objects, features and advantages of the present invention will be readily apparent from the following detailed description of certain preferred embodiments thereof taken in conjunction with the accompanying drawings, in which:

Figure 1 is a side elevational view of a vehicle wheel structure embodying features of the invention.

Figure 2 is a fragmentary enlarged radial sectional view taken substantially on the line II—II of Fig. 1.

Figure 3 is a fragmentary sectional elevational view of the cover of Fig. 2 taken substantially on the line III—III of Fig. 2.

Fig. 4 is a fragmentary radial sectional view similar to Fig. 2 but showing a modification of the cover.

Figure 5 is a fragmentary elevational sectional view taken substantially on the line V—V of Fig. 4.

Figure 6 is an outer side elevational view of a vehicle wheel embodying features of the invention and showing another modification.

Figure 7 is a fragmentary radial enlarged sectional view taken substantially on the line VII—VII of Fig. 6.

Figure 8 is a fragmentary sectional elevational view of the cover of Fig. 7 taken substantially on the line VIII—VIII of Fig. 7.

Figure 9 is an outer side elevational view of a wheel structure showing still another modification.

Figure 10 is a radial sectional enlarged fragmentary view taken substantially on the line X—X of Fig. 9, and Figure 11 is a fragmentary sectional elevational view of the cover taken substantially on the line XI—XI of Fig. 10.

Having reference to Figures 1–3, a cover 15 is adapted to be disposed at the outer side of a vehicle wheel including a disk spider wheel body 17 having at the outer margin thereof a generally axially inwardly extending attachment flange 18 secured in suitable manner to a base flange 19 of a tire rim. At suitable intervals such as three or four, the flange 18 is inset to provide openings 20 through the wheel for air circulation and the like. From the base flange 19, extends a rim side flange 21 sloping radially and axially outwardly and merging with an intermediate generally axially outwardly and radially outwardly oblique intermediate flange 22 which joins a generally radially outwardly and then axially outwardly turned terminal flange 23. Construction and relationship of the flanges of the tire rim are such that a tire and tube assembly or a tubeless tire 24 can be supported thereby. For inflation of the tire a valve stem 25 projects at a suitable place from the side flange 21 of the tire rim.

In the present instance the tire rim is of the safety rim type provided at the axially inner side of the intermediate flange 22 with an annular radially inwardly opening groove 27 which at its axially inner side merges with the side flange 21 and provides at its axially outer side a generally axially and radially inwardly facing shoulder 28.

According to the present invention the cover 15 is constructed and arranged to be retained on the wheel by interengagement of retaining means thereon within the groove 27 and more particularly with the shoulder 28. To this end, the cover 15 comprises a stamped or drawn sheet metal member which in the present instance is of the full disk type and of a diameter to substantially entirely cover the outer side of the wheel. Suitable sheet metal stock in strip or other blank form may be used in making the cover, stainless steel, sheet brass, or the like being suitable for the purpose. At its center the cover 15 has a crown portion 29 for overlying the central portion of the wheel body. Spaced radially outwardly from the crown 29 is an annular outer marginal substantially rigid cover portion 30 for overlying the tire rim and more especially the terminal flange 23 and the adjacent portion of the intermediate flange 22. Connecting the crown portion 29 and the outer marginal portion 30 is a series of circumferentially spaced, generally radially elongated strongly resilient spoke elements 31 which are substantially unyielding in a circumferential direction, but are resiliently flexible in a radial direction.

It is the spoke elements 31 which provide the means for snap-on, pry-off retention of the cover on the wheel. To this end, the spoke elements are constructed to extend from a continuous annular generally axially inwardly directed side flange 32 of the crown portion 29 generally radially outwardly and axially inwardly to lie in substantial spaced relation from the wheel body 17 but to engage at their radially outer portions in cover supporting relation against the side flange 21 of the tire rim. To enhance the resiliency of the spoke elements 31, while nevertheless having the same of substantially narrow form as best visualized in Figs. 1 and 3, the spoke elements are transversely arched, preferably axially outwardly throughout their lengths from the juncture with the crown flange 32 to the point at which the spoke elements contact or bottom against the side flange 21. In addition, the spoke elements are of inwardly dished or curved or arched form, thereby controlling radially inward and axially inward tensioned deflection thereof responsive to radially inward thrust or pressure exerted against the radially outer portions thereof.

For retaining engagement within the rim groove 27, the radially outer portions of the spoke elements 31 are provided with radially outwardly projecting shoulder means 33 in the form of concave convex, humped intermediate shoulder portions which normally project to a limited greater diameter than the maximum diameter within the rim groove 27. Thence, the outer terminal end portions of the spoke elements extend generally radially inwardly and then axially outwardly to a substantial length so as to afford resilient flexibility in the terminal end portions and complete clearance radially inwardly from the intermediate flange 22 axially outwardly from the groove shoulder 28. At their extremities the spoke terminal end portions join a continuous annular generally axially inwardly extending inner marginal flange 34 of the outer cover portion 30 and from which the remainder of the outer cover portion extends generally radially outwardly in spaced overlying relation to the terminal flange 23 and about the shoulder at juncture of the terminal and intermediate flanges.

At its outer extremity, the cover portion 30 has an underturned reinforcing and finishing bead 35 which may be disposed in assembly adjacent to the tip of the terminal flange 23. Behind the outer cover portion 30 is provided a substantial chamber with the terminal flange to afford a concealed housing for wheel balancing weights. For rigidity and to provide a convenient inner pry-off shoulder, the annular cover member 30 is provided with an intermediate generally axially inwardly indented annular rib 37 which is adapted to oppose in spaced adjacency the juncture shoulder between the terminal and intermediate flanges of the tire rim.

In applying the cover 15 to the outer side of the wheel, it is generally centered relative to the wheel with the valve stem 25 projecting through one of the substantial openings between the spoke elements 31, and inward pressure is then exerted against the cover member and more particularly the outer annular portion 30 thereof to cause the retaining shoulders 33 of the cover to cam axially inwardly along the sloping face of the intermediate flange 22 until the retaining shoulders snap into the rim groove 27 into retaining relation behind the shoulder 28, accompanied by tensioned bottoming of the spoke elements adjacent to the shoulders 33 against the side flange 21. As an incident to the radially inward tensioning flexure of the retaining finger shoulders 33, the spoke elements 31 are resiliently flexed and thus exert a radially outward tensioning reaction toward the retaining shoulders 33 to assure firm retaining grip thereof within the groove 27.

For removing the cover from the wheel, a pry-off tool such as a screw driver or the like, may be applied behind the outer edge bead 35 and levered against the terminal flange 23, with additional pry-off leverage exerted against the reinforcing and pry-off rib shoulder 37 as the tool is worked further under the cover, until the retaining shoulders 33 of the cover are resiliently flexed out of the groove 27 and outwardly past the retaining shoulder 28.

In Figs. 4 and 5 a cover 38 is shown as applied to the outer side of the wheel which in all material respects is the same as the wheel of Fig. 2 and therefore similar parts of the wheel are identified by the same reference numerals. In most respects the cover 38 is the same as the cover 15. It may be provided with a similar crown portion (not shown) from which extend generally radially outwardly and axially inwardly elongated spoke elements 39 which may be of substantially the same construction as the spoke elements 31. At their radially outer end portions, the spoke elements 39 are, in assembly with the wheel, in resilient tensioned engagement with the side flange 21 of the tire rim for supporting the cover in spaced relation to the wheel body 17.

For retaining the cover 38 on the wheel, the radially outer terminal portions of the spoke elements 39 are provided with means for engaging the tire rim retainingly within the groove 27 and more particularly behind the shoulder 28, in the present instance comprising struck-out generally radially outwardly projecting respective retaining lugs 40 which are pressed from the longitudinally central portion of each of the fingers in a generally axially outwardly extending terminal portion 41 and have generally axially outwardly directed retaining edges 42 arranged to engage grippingly behind the rim flange shoulder 28. It will be appreciated that the lugs 40 by virtue of the generally semi-conoidal form are of substantial stiffness and thus reliance upon resilient deflectability of the spoke elements 39 including the terminal portions 41 thereof is relied upon to enable radially inward deflection of the lugs from a limited greater diameter than the maximum diameter within the groove 27 to which the lugs project in the normal condition thereof before application of the cover to the wheel.

At their outer extremities, the terminal portions 41 of the spoke elements join a continuous annular axially inwardly extending flange portion 43 of a rigid annular outer marginal cover portion 44 which extends from the flange 43 generally radially outwardly for overlying the terminal flange 23. At its other edge the cover member 44 is provided with an underturned reinforcing and finishing bead 45, and intermediately, spaced radially inwardly from the bead 45 a generally axially inwardly directed reinforcing and pry-off rib 47 is provided opposite the juncture shoulder between the intermediate and terminal flanges.

Application of the cover 38 to the outer side of the wheel is effected similarly as described in connection with the cover 15, as is also pry-off or removal of the cover from the wheel.

In Figures 6-8, a cover 48 is shown applied to the outer side of the wheel which is in all essential respects the same as the wheel of Fig. 2 and thus identified in its several parts by the same reference numerals. The cover 48 includes a central crown portion 49 and a radially outwardly spaced annular substantially rigid portion 50. The crown portion includes a side wall 51 sloping generally radially outwardly and axially inwardly to lie in assembly with the wheel adjacent to but spaced radially inwardly from the wheel openings 20.

Connecting the outer extremity of the crown side wall 51 with the outer annular cover portion 50 is a series of alternating axially inwardly directed or bowed and axially outwardly arched spoke elements 52 and 53, respectively. It will be noted that the spoke elements lie opposite the wheel openings 20 and afford substantial circumferentially directed openings therebetween. The inner spoke elements 52 are arranged to engage under resilient seating tension against the side flange 21 of the tire rim for supporting the cover in spaced relation to the wheel body 17. At their outer extremities, the spoke elements 52 and 53 are connected to a generally axially inwardly extending continuous annular flange 54 of the outer cover portion 50, and from which the outer cover portion extends generally radially outwardly in overlying relation to the terminal flange 23 and is provided with an outer extremity turned reinforcing and finishing bead 55, and an intermediate axially inwardly directed annular reinforcing and pry-off rib shoulder 57.

For retaining the cover 48 on the wheel, the spoke elements 52 and 53 are provided with radially outwardly projecting resilient cover retaining humps or shoulders 58 which normally project to a diameter greater than the maximum diameter within the rim groove 27 so that the shoulders 58 are adapted to snap in resilient retaining relationship into the groove behind the retaining shoulder 28 of the rim. It will be observed that the terminal extremities of the spoke elements 52 and 53 are spaced substantially radially inwardly to clear the intermediate flange 22. Accordingly in applying the cover to the outer side of the wheel, it is generally centered with respect to the wheel, and the valve stem 25 is registered with an appropriate aperture in one of the spoke elements and the cover pressed axially inwardly to snap the retaining shoulders 58 of the spoke elements behind the rim shoulder 28. To remove the cover from the wheel, a pry-off tool is inserted behind the outer portion 50 of the cover and levered against the outer edge bead 55 and the shoulder 57.

In Figs. 9-11, a cover 60 is shown for disposition at the outer side of the wheel which is, again, of the same structure as in Fig. 2 and therefore similarly identified with respect to the several parts thereof. In this instance the cover 60 comprises a one piece sheet metal drawn stamping of a diameter to overlie the entire outer side of the wheel inclusive of the terminal flange 23, and for this purpose includes a central crown portion 61 for overlying the central portion of the wheel body 17. Sloping generally radially outwardly and axially inwardly from the peak of the crown 61 is a side wall 62 from which extend a series of generally radially outwardly and axially inwardly bowed resilient spoke elements 63 divided by narrow slots 64 and joining the crown side wall 62 with an annular substantially rigid outer marginal generally axially outwardly projecting rib-like cover portion 65 which in service overlies the terminal flange 23 and has an underturned reinforcing and finishnig bead which may engage against the tip of the terminal flange and thereby support the cover in spaced relation to the wheel body 17 and most of the rest of the wheel rim.

For retaining the cover on the wheel, the elongated substantially strap-like spoke elements 63 are provided adjacent their outer extremity portions with generally radially outwardly projecting cover retaining hump shoulders 67 engageable retainingly within the wheel rim groove 27 behind the retaining shoulder 28 thereof. The outer extremity portions of the spoke elements 63 outwardly beyond the shoulders 27 are of a length to extend axially outwardly in substantial spaced relation to the axially outer portion of the intermediate flange 22 of the tire rim with integral engagement with the inner extremity portion of the marginal cover part 65. The relationship between the cover part 65 and the retaining shoulders 67 is such that as an incident to camming of the retaining shoulders 67 behind the rim shoulders 28 axially inward attention is applied through the resilient outer terminal portions of the poke elements 63 to draw the bead 66 against the tire rim terminal flange tip. It will be appreciated that the spoke elements 63 are of substantial resilience enabling resilient radially inward deflection of the retaining shoulders 67 in camming over the intermediate flange 22 into retaining engagement within the groove 27, and camming out of the groove past the shoulder 28 on application of pry-off tool behind the rigid outer marginal portion 65 of the cover.

In all forms of the cover, it will be observed that the elongated spoke elements with spaces therebetween overlie the wheel openings 20 and therefore enable circulation of air through the cover and through the wheel openings. It will also be observed that in all forms of the cover the long both radially and axially resiliently deflectable spokes that connect the rigid crown portion of the cover to the rigid radially outer marginal portion of the cover support the cover crown in substantially floating resiliently deflectable relation to the wheel whereby to protect the crown portion form, or at least minimize the damaging effect upon the crown portion, of curbing or like pressures or thrusts which might otherwise tend to dent or damage the crown.

Where the spoke elements are narrow as in the forms of Figs. 2 and 4, the combination of transverse and longitudinal arching thereof enhances the resiliency thereof. Where the spoke elements are of maximum width, that is with only minimum metal removed between the spoke elements, as in the form of Fig. 10, the mass of metal in a transverse sense affords a substantial degree of resilience enhanced by the working of the material into longitudinally bowed shape.

It will be understood that modifications and variations may be effected without departing from the scope of the novel concepts of the present invention.

I claim as my invention:

1. In a wheel structure including a wheel body and a tire rim provided with an annular shoulder facing generally radially and axially inwardly toward a generally axially outwardly facing portion spaced axially inwardly from the shoulder, a cover for disposition at the outer side of the wheel including a substantially rigid crown portion and a substantially rigid outer annular marginal portion for overlying the tire rim, and having a series of generally radially outwardly extending resilient circumferentially spaced spoke-like connecting elements for overlying the wheel body and the tire rim between said crown and outer marginal portions and provided with generally radially outwardly projecting respective retaining shoulders adjacent to outer terminal end portions thereof, said outer terminal end portions being resiliently flexible and of substantial length and spaced radially inwardly from said spoke element shoulders for spaced clearance relative to the tire rim and projecting generally axially outwardly and connected to a generally axially inwardly extending annular continuous flange portion of said outer marginal cover portion, said spoke-like elements being of substantially greater length from said crown portion to said spoke element shoulders than said outer terminal end portions and being arched generally axially inwardly for resilient thrust against said axially facing rim portion for resilient tensioning of the spoke element shoulders into engagement with the rim shoulder.

2. In a wheel structure including a wheel body and a tire rim provided with an annular shoulder facing generally radially and axially inwardly toward a generally axially outwardly facing portion spaced axially inwardly from the shoulder, a cover for disposition at the outer side of the wheel including a substantially rigid crown portion and a substantially rigid outer annular marginal portion for overlying the tire rim, and having a series of generally radially outwardly extending resilient circumferentially spaced spoke-like connecting elements for overlying the wheel body and the tire rim between said crown and outer marginal portions and provided with generally radially outwardly projecting respective retaining shoulders adjacent to outer terminal end portions thereof, said outer terminal end portions being resiliently flexible and of substantial length and spaced radially inwardly from said spoke element shoulders for spaced clearance relative to the tire rim and projecting generally axially outwardly and connected to a generally axially inwardly extending annular continuous flange portion of said outer marginal cover portion, said spoke-like elements being of substantially greater length from said crown portion to said spoke element shoulders than from the shoulders to said outer terminal end portions and being arched generally axially inwardly toward said axially outwardly facing rim portion and supporting said crown portion in substantially floating resiliently deflectable relation to the wheel whereby to protect the crown portion from, or at least to minimize the damaging effect thereupon of, curbing or like pressures or thrusts thereagainst.

3. In a wheel structure as defined in claim 2, said spoke-like elements engaging resiliently in the inwardly arched portions thereof against said axially outwardly facing rim portion and thereby maintaining said retaining shoulders in tensioned thrusting retaining engagement with said annular tire rim shoulder.

4. In a wheel structure as defined in claim 2, said retaining shoulders comprising edges on said spoke-like elements retainingly engaging said annular tire rim shoulder.

5. In a wheel structure as defined in claim 2, said spoke-like connecting elements being transversely arched to augment the resiliency thereof.

6. In a wheel structure as defined in claim 2, said generally axially inwardly arched spoke-like connecting elements having alternatingly therebetween additional spoke-connecting elements which are arched generally axially outwardly.

7. In a wheel structure as defined in claim 2, said rigid outer annular marginal portion of the cover engaging the tire rim radially and axially outwardly beyond said retaining shoulders and thereby maintaining the retaining shoulders in tensioned engagement with said rim shoulder and supporting the cover in spaced relation to the wheel body and maintaining said axially inwardly arched spoke-like connecting elements in axially outwardly spaced relation to said axially outwardly facing portion of the tire rim.

References Cited in the file of this patent

UNITED STATES PATENTS

| | | |
|---|---|---|
| D. 167,271 | McLeod | July 15, 1952 |
| 2,308,617 | Lyon | Jan. 19, 1943 |
| 2,544,701 | Lyon | Mar. 13, 1951 |
| 2,584,143 | Lyon | Feb. 5, 1952 |
| 2,660,480 | Lyon | Nov. 24, 1953 |

FOREIGN PATENTS

| | | |
|---|---|---|
| 769,819 | France | Sept. 3, 1934 |
| 1,004,084 | France | Mar. 25, 1952 |